United States Patent [19]

Bryan et al.

[11] Patent Number: 5,646,412
[45] Date of Patent: Jul. 8, 1997

[54] COATED RADIOGRAPHIC PHOSPHORS AND RADIOGRAPHIC PHOSPHOR PANELS

[75] Inventors: Philip Steven Bryan, Webster; Joseph F. Bringley, Rochester; Richard E. Partch, Hannawa Falls, all of N.Y.

[73] Assignee: Eastman Kodak Company, Rochester, N.Y.

[21] Appl. No.: 629,493

[22] Filed: Apr. 10, 1996

[51] Int. Cl.$^6$ .......................................................... G01J 1/58
[52] U.S. Cl. ............................... 250/483.1; 252/301.36
[58] Field of Search ............................ 250/483.1, 484.3, 250/484.4, 486.1; 252/301.36

[56] References Cited

U.S. PATENT DOCUMENTS

| | | | |
|---|---|---|---|
| 4,138,361 | 2/1979 | Suys et al. | 252/301 |
| 4,180,740 | 12/1979 | Suys et al. | 250/483 |
| 4,246,485 | 1/1981 | Bossomaier et al. | 250/486 |
| 4,360,571 | 11/1982 | Rabatin | 428/691 |
| 4,374,905 | 2/1983 | Rabatin | 428/691 |
| 4,380,702 | 4/1983 | Takahashi et al. | 250/327.2 |
| 4,452,861 | 6/1984 | Okamoto et al. | 428/402.2 |
| 4,491,736 | 1/1985 | Teraoka | 250/484 |
| 4,863,826 | 9/1989 | Arakawa et al. | 430/138 |
| 5,378,577 | 1/1995 | Smith et al. | 430/138 |
| 5,401,971 | 3/1995 | Roberts | 250/484.4 |

FOREIGN PATENT DOCUMENTS

| | | |
|---|---|---|
| 0 209 358 A2 | 1/1987 | European Pat. Off. . |
| 0 234 385 B1 | 9/1987 | European Pat. Off. . |
| 62-296582/42 | 9/1987 | Japan . |
| 62-296583/42 | 9/1987 | Japan . |
| 2 017 140 | 10/1974 | United Kingdom . |

OTHER PUBLICATIONS

Research Disclosure, vol. 184, Aug. 1979, Item 18431, Section 1.

Research Disclosure, vol. 176, Dec. 1978, Item 17643, Section XVII.

R. B. Reif, Evaluation of Microencapsulated Phosphors, NTIS Report #AFML-TR-79-4071, Dec. 21, 1979.

R. Chambers et al., Effective Method for Encapsulation of Titanium Dioxide and other Solids by Gamma-ray induced Polymerisation, J. Mater. Chem., 1991, vol. 1, pp. 59–62.

A. T. Florence et al., Potentially biodegradable microcapsules with poly (alkyl 2-cyanoacrylate) membranes, J. Pharm. Pharmacol, 1979, p. 422.

"Coating of Fine Particles:, Newsletter, Center for Advanced Materials Processing", Clarkson University, Potsdam, New York, vol. 9, No. 3 (Jun. 1994), Published Jul. 25, 1994.

Hayashi, Waterproofing phosphors by heating in silicone oil, Chemical Abstract #66637j, vol. 110, 1989, p. 66646.

Yokoyama, Double-coated waterproof alkaline earth sulfide phosphors, Chemical Abstract #66638k, vol. 110, 1989, p. 66646.

Yoshino, Surface-treated phosphor and its preparation, Chemical Abstract #66639m, vol. 110, 1989, p. 66646.

Primary Examiner—David P. Porta
Assistant Examiner—Richard Hanig
Attorney, Agent, or Firm—Carl O. Thomas

[57] ABSTRACT

A radiographic phosphor panel and radiographic phosphor composition. The radiographic phosphor panel includes a support and a luminescent layer. The luminescent layer overlies the support. The luminescent layer includes binder and coated particles. The binder is a film-forming polymer. The coated particles are embedded in the binder. The coated particles each have a core and a shell. The core is radiographic phosphor. The shell is exterior to and substantially encloses the core. The shell comprises vinyl-epoxy resin, having uncured epoxy groups in a concentration of from about $1\times10^{-5}$ to about 60 percent by weight relative to the weight of the shell. The resin has a different composition than the binder.

23 Claims, No Drawings

COATED RADIOGRAPHIC PHOSPHORS AND RADIOGRAPHIC PHOSPHOR PANELS

FIELD OF THE INVENTION

The invention relates to radiographic apparatus and more particularly relates to coated radiographic phosphors and radiographic phosphor panels.

BACKGROUND OF THE INVENTION

A radiographic phosphor panel contains a layer of phosphor, a crystalline material which responds to X-radiation on an image-wise basis. Like many other crystalline materials, radiographic phosphors have a crystal matrix which allows for the replacement of some atoms by other similar atoms, but does not readily accept other atoms or moieties. Radiographic phosphor panels can be classified, based upon their phosphors, as prompt emission panels and image storage panels.

Intensifying screens are the most common prompt emission panels. Intensifying panels are used to generate visible light upon exposure of the intensifying panel to X-radiation. A sheet of photographic film is positioned to intercept the visible light generated and commonly is pressed against the intensifying panel within a light-tight cassette. Other prompt emission panels operate similarly, but in place of the photographic film have some other means for visualizing the X-radiation.

Storage panels have storage phosphors, that have the capability of storing latent X-ray images for later release, apparently by locally trapping electron-hole pairs created by incident X-rays. Storage phosphors are distinguishable from the phosphors used in X-ray intensifying or conversion screens. In the latter, a latent image is not stored and X-radiation causes the immediate release of visible light from irradiated phosphor crystals.

Radiation image storage panels are used in computed radiography. The panel is first exposed to X-radiation to create a latent image. The panel is then stimulated with longer wavelength radiation, resulting in the emission of radiation at a third wavelength. Typically a laser having a red or infrared beam is scanned over the panel, resulting in the emission of green or blue radiation. The emitted light is collected and the resulting signal is processed electronically to produce a final image.

Radiographic screens or panels have a support, a luminescent layer which includes the radiographic phosphor, and, generally, an overcoat layer to protect the phosphor layer. An overcoat layer is, desirably, substantially clear and transparent to the light emitted by the X-ray phosphor. To the extent that the overcoat absorbs any of the light emitted by the luminescent layer, the light output from the screen will be diminished, resulting in the need for increased X-ray exposure. An overcoat which is hazy, scattering the light used to stimulate the phosphor layer, can lead to a spreading-out of the stimulating light and a blurring of the image of fine objects, such as, cracks in bone or narrow blood vessels and an observed unsharpness and loss of diagnostic information.

An overcoat layer helps protect the phosphor layer underneath from mechanical damage due to scratches and abrasion, which would otherwise result in surface defects leading to artifacts in radiographs produced. In addition, an overcoat for all but the most moisture-resistant phosphors, must provide a barrier to the penetration of moisture, in the form of water vapor or liquid water, which would degrade the performance of the phosphor. Moisture penetration commonly has the effect of causing the panel to either have reduced light output, requiting the use of an increased X-ray dose to produce the same radiographic film density, or causing more localized dimmer areas as artifacts in resulting radiographs.

Degradation of final images due to phosphor panel discoloration is a particularly serious concern for radiation image storage panels, since unlike intensifying screens, storage panels are subject to cumulative degradative losses of both emitted light and stimulating radiation. There has not been agreement as to the mechanism of phosphor panel discoloration, but water and molecular iodine may both be involved.

What was noticed early was that intensifying panels subject to prolonged exposure to photographic film have tended to become discolored. U.S. Pat. Nos. 4,374,905 and 4,360,571 state that the discoloration is due to "volatile organic constituents escaping from the associated photographic film" (U.S. Pat. No. 4,374,905, column 1, lines 40–59 and U.S. Pat. No. 4,360,571, column 1, lines 46–64). Great Britain Patent Application No. GB 2 017 140 A states:

"[I]t has been discovered that screens containing lanthanum[or gadolinium]-oxy-halide phosphors tend to discolor rapidly when in use and in particular when held in contact with an X-ray film, . . .

"In spite of intensive research into this discolouration defect the cause of it is not yet clearly known but it appears to be a complex reaction caused, in part at least, by the hydroscopic nature of the lanthanum-oxy-halide phosphors or gadolinium-oxy-halide phosphors, the nature of the binder and the presence of the X-ray film held in contact with the screen for a period of time.

"Furthermore, under somewhat different conditions of use X-ray screens and in particular X-ray screens which contain lanthanum-oxyhalide or gadolinium-oxyhalide phosphors can lose speed due to a different defect which appears to involve only the phosphor. This is hydrolysis of the phosphor which is caused by water present in the phosphor layer due either to atmospheric moisture or aqueous cleaning fluid penetrating the protective layer of the screen. It is thought that quantities of halide or more surprisingly, the free halogen, released by hydrolysis may actually catalyse the discolouration of the binder or of compounds having migrated from the film." (page 1, lines 14–33)

Yellowing of a phosphor layer of a radiation image storage phosphor panel, in which the phosphor contains iodine, is described in European Patent Specification No. EP 0 234 385 B 1. The yellowing is ascribed to liberation of free iodine. An approach which has been taken to reduce storage panel yellowing is the incorporation of a stabilizer within one or more layers of the panel. European Patent Specification No. EP 0 234 385 B1 discloses as stabilizers a compound containing a free epoxy group and/or a compound selected from: phosphites, organotin compounds, and metal salts of particular organic acids.

Among materials which provide good moisture barrier properties are polymers having chlorine or fluorine containing monomer units, such as poly(vinylidene fluoride) and its copolymers. These materials, when used as X-ray panel overcoat layers, however, have the shortcoming of poor resistance to abrasion or scratches. In addition, many of these polymers form hazy films when solvent-cast. Overcoat layers have not proven particularly useful for preventing panel discoloration or yellowing associated with iodine.

U.S. Pat. No. 4,863,826 to Arakawa et al. describes a radiation image storage panel comprising a support, binder and stimulable phosphor particles characterized in that said stimulable phosphor particles are covered with a polymer material. The phosphor particles are in the form of a microcapsule comprising a phosphor particle as as a core material and a polymer material as a shell. The polymer material is selected from the group consisting of polyester, nitrocellulose and polyakyl acrylate.

It would be desirable to provide improved radiographic panels and coated phosphors, in which yellowing or other environmentally-induced degradation is reduced.

SUMMARY OF THE INVENTION

The invention, in its broader aspects, provides a radiographic phosphor panel and radiographic phosphor composition. The radiographic phosphor panel includes a support and a luminescent layer. The luminescent layer overlies the support. The luminescent layer includes binder and coated particles. The binder is a film-forming polymer. The coated particles are embedded in the binder. The coated particles each have a core and a shell. The core is radiographic phosphor. The shell is exterior to and substantially encloses the core. The shell comprises vinyl-epoxy resin, having uncured epoxy groups in a concentration of from about $1 \times 10^{-5}$ to about 60 percent by weight relative to the weight of the shell. The resin has a different composition than the binder.

It is an advantageous effect of at least some of the embodiments of the invention that improved radiographic panels and coated phosphors are provided in which yellowing or other environmentally-induced degradation is reduced.

DESCRIPTION OF PARTICULAR EMBODIMENTS

The radiographic phosphor panel of the invention has a support and a luminescent layer overlying the support. The luminescent layer comprises polymeric binder and coated particles embedded in the binder. The coated particles each have a core and a shell exterior to and substantially enclosing the core. The core consists essentially of radiographic phosphor. The shell comprises vinyl-epoxy polymer (also referred to herein as "resin") having a different composition than the binder. The resin has uncured epoxy groups in a concentration of from about $1 \times 10^{-5}$ to about 60 percent by weight relative to the weight of the shell. The terms "uncured epoxy group" and "epoxy group" are used herein to refer to a moiety having the general structure:

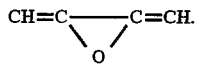

A "cured epoxy group" is a moiety resulting from the reaction of an uncured epoxy group and another reactant. The concentration of epoxy groups in the resin can effect the overall physical characteristics of the shell, such as strength, hardness, and adhesion. The concentration be varied to meet the requirements of a particular use. In particular embodiments of the invention, good strength, hardness and adhesion are provided by a shell having a concentration of uncured epoxy groups in the range of about 0.1 to about 20 percent by weight relative to the weight of the resin or a concentration of uncured epoxy groups in the range of about from about 0.1 to about 4 percent by weight relative to the weight of the resin.

The following description is primarily directed to radiographic image storage panels, however, the invention is not limited to storage panels; but is also applicable to prompt emission panels such as intensifying screens.

The resin is a vinyl addition polymer having a preferred weight average molecular weight in the range of about 10,000–1,000,000. The resin can be represented by the general formula:

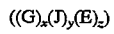

G is an olefinic subunit having from 2 to about 20 carbons and a valence greater than 2. J is a divalent olefinic subunit having from 2 to about 20 carbons. E is an olefinic subunit having from 4 to about 22 carbons, a valence of 2 or greater and a pendent or main chain epoxide group. G and J are monomeric units, that if polymerized alone, would form branched and straight chain polyolefins, respectively. The terms "valence", "divalent", and the like designate, for an indicated subunit, the number of carbon-carbon bonds to other subunits. G, J, and E, can be aliphatic or aromatic and can include heteroatoms selected from the group consisting of N, S, and O. The subscripts x, y, and z are mole percents that together are substantially equal to about 100 weight percent. x is from about 0.01 to about 99.99 mole percent. y is from 0 to about 99.98 mole percent. z is from about 0.01 to about 10 mole percent.

Preferred monomers are either crosslinkable or hydrophobic, or more preferably, both crosslinkable and hydrophobic. Crosslinking can be provided directly by the monomers themselves or by an additional crosslinking agent, such as divinylbenzene or vinyl norbornene. The following are examples of suitable monomers that are directly crosslinkable and hydrophobic: divinylbenzene; vinyl norbornene; 2,5-norbornadiene; dicyclopentadiene; 1,5-cyclooctadiene; and diallyl phthalate. The following are examples of suitable monomers that are hydrophobic: vinylidene chloride; vinylidene fluoride; tetraphenylethylene; styrene; vinyl toluene; and vinylbenzyl chloride. The following monomers are not preferred but are suitable: methyl acrylate; alpha-methyl styrene; allyl acetate; allyl alcohol; allyl amine; allylbenzene; acrylamide; butyl acrylate; 2-vinylpyridine; trans-stilbene; and poylstyrene/divinylbenzene copolymers and their fluorinated and chlorinated derivatives. The resin can be an inorganic-organic polymer or composite such as a vinyl siloxane. It is desireable to exclude or minimize functional groups and/or impurities in the polymer or polymers that will "cure" epoxides. Examples of such functional groups and impurities are water, alcohols, carboxylic acids, amines, amides and strong acids and bases. The degree of reaction with the epoxide may vary widely with various functionalities and will depend upon temperature and time, etc. It is often necessary to accelerate the formation of the polymer shell upon the phosphor particles by the addition of a suitable initiator. Examples of initiators are organic peroxides or hydroperoxides such as benzoyl peroxide, redox reagents such as persulfates and thiosulfates, azo compounds such as azobisisobutylnitrile (AIBN), organometallic reagents such as silver alkyls and also heat, light or high energy radiation such as ultraviolet light.

In a particular embodiment of the invention the resin, G subunits of the resin have the general formula:

$$-CH_2-CH-$$
$$\begin{vmatrix} R^1 \end{vmatrix}$$
$$-CH-CH_2-$$

and J subunits have the general formula:

$$-CH_2-CH-$$
$$\begin{vmatrix} R^2 \end{vmatrix}$$

$R^1$ and $R^2$ are alkyl, aryl, fluoroalkyl, chloroalkyl, or fluorochloroalkyl. In these embodiments, E can prove same general formula as G or J except that E also includes a pendant or main chain epoxide. In one embodiment of the invention, $R^1$ is phenyl and $R^2$ is phenyl.

The resin can be coated over the phosphor cores by any method that ensures substantially complete coating of the cores. It is currently highly preferred that the shell of the coated particles be formed by in situ polymerization of the resin while the core particles are dispersed in the medium. A suitable thickness for the shell is from about 0.01 to about 10 micrometers. A preferred thickness for the shell is from about 0.1 to about 2 micrometers. A suitable concentration for the resin relative to the coated particles is from about 0.1 to about 10 weight percent. A preferred concentration for the resin relative to the coated particles is from about 0.5 to about 2 weight percent.

A coupling agent can be added to facilitate the formation of the polymer shell directly onto the surface of the phosphor core and to provide good adhesion of the polymer shell to the core particle. Suitable coupling agents have a Lewis base element such as B or Al bearing multiple organofunctionalities. Desirably, at least one of the organofunctionalities contains a vinyl group. A specific example of a suitable coupling agent is triallyl borate.

The core can be any radiographic phosphor; however, the advantage provided by the invention is the substantial isolation of the phosphor core from the ambient environment. This advantage is significant when the phosphor of the core is subject to degradation by materials in the ambient environment, such as oxygen and water vapor. In particular embodiments of the invention, the luminescent layer of the radiographic panel includes phosphor that is subject to iodine-associated discoloration. This discoloration is associated with the presence of oxygen and/or atmospheric water. Examples of such phosphors are divalent alkaline earth metal fluorohalide storage phosphors containing iodine and alkali metal halide storage phosphors containing iodine.

In particular embodiments of the invention, the phosphor is a storage phosphor which is the product of firing starting materials comprising a combination of species characterized by the relationship:

$$MFX_{1-z}I_z:uM^aX^a:yA:eQ:tD,$$

where M is selected from Mg, Ca, Sr, and Ba; X is selected from Cl and Br; $M^a$ is selected from Na, K, Rb, and Cs; $X^a$ is selected from Cl, Br, and I; A is selected from Eu, Ce, Sm, and Tb; Q is an oxide selected from BeO, MgO, CaO, SrO, BaO, ZnO, $Al_2O_3$, $La_2O_3$, $In_2O_3$, $SiO_2$, $TiO_2$, $ZrO_2$, $GeO_2$, $SnO_2$, $Nb_2O_5$, $Ta_2O_5$, and $ThO_2$; and D is selected from V, Cr, Mn, Fe, Co, and Ni. Numbers are represented by the following: z is from $1\times10^{-4}$ to 1, u is from 0 to 1, y is from $1\times10^{-4}$ to 0.1, e is from 0 to 1, or more preferably from $1\times10^{-5}$ to from 0 to $1\times10^{-2}$. The same designations appearing elsewhere herein have the same meanings unless specifically stated to the contrary. Groups of materials, for example the materials defined by M, are to be understood as inclusive of combinations of materials in that group.

In some of those embodiments of the invention, the panel includes a divalent alkaline earth metal fluorohalide storage phosphor containing iodine which is the product of firing an intermediate, a combination of species characterized by the relationship:

$$(Ba_{1-a-b-c}Mg_aCa_bSr_c)FX_{1-z}I_z:rM^aX^a:yA:eQ$$

where X, $M^a$, $X^a$, A, Q, z, y, and e have the same meanings as in formula (1) and the sum of a, b, and c is from 0 to 0.4, and r is from $1\times10^{-6}$ to 0.1. $M^a$ can be potassium and r can be from $1\times10^{-4}$ to 0.01, as described in U.S. patent application Ser. No. 08/157,583, filed Nov. 24, 1993, now abandoned in favor of continuation-in-part application Ser. No. 08/300,116, filed Sep. 2, 1994. The phosphor can be one of those described in U.S. patent application Ser. No. 08/157,582, filed Nov. 24, 1993, now abandoned in favor of Continuation-in-Part application Ser. No. 08/300,113, filed Sep. 2, 1994. In that patent application, barium fluorohaloiodide phosphor is produced by firing a combination of species that includes one or more oxosulfur reducing agents or pigments. (The oxosulfur reducing agents and oxosulfur reducing pigments are the same as those disclosed herein). The oxosulfur reducing agent and/or oxosulfur reducing pigment is present, in an unfired precursor mixture, in an amount sufficient to increase relative photostimulated luminescence intensities relative to the same phosphor absent the oxosulfur stabilizer. The unfired precursor defines an upper limit for the presence of sulfur atoms in the resulting phosphor. In one of the phosphors disclosed, sulfur atoms are present in the unfired precursor, and thus in the crystals of the resulting phosphor, in a molar ratio of sulfur atoms to alkaline earth metal of less than 0.20, or preferrably, less than 0.020. In another phosphor disclosed, the minimum amount of sulfur atoms present in the unfired composition is in a molar ratio of sulfur atoms to alkaline earth metal of greater than $1\times10^{-4}$ and less than 0.020. Oxosulfur reducing species is believed to be retained in the phosphors after firing, but its presence, oxidation number and other characteristics are not confirmed.

The luminescent layer of the phosphor panel of the invention contains a polymeric binder to give it structural coherence. The binder is a film forming polymer. The binder and other materials used in the preparation of the luminescent layer can be selected from a wide variety of materials known to those skilled in the art, subject to the limitation that the materials used in the preparation of the luminescent layer must not substantially degrade the coated particles. For example, it is convenient to prepare the luminescent layer by solvent casting a dispersion of the coated particles in a solution of binder and a solvent for the binder. It is highly desirable that the solvent used have little or no effect on the shells of the coated particles. Similarly, it is highly desirable that the materials used to prepare the luminescent layer be free, or substantially free, of compounds or substituents that would "cure" epoxy groups in the shell.

In general the binders useful in the practice of the invention are those conventionally employed in the art. Binders are generally chosen from a wide variety of known organic polymers which are transparent to X-rays, stimulating, and emitted light. Binders commonly employed in the art include sodium o-sulfobenzaldehyde acetate of poly(vinyl alcohol); chlorosulfonated poly(ethylene); a mixture of macromolecular bisphenol poly(carbonates) and copolymers comprising bisphenol carbonates and poly(alkylene oxides);

aqueous ethanol soluble nylons; poly(alkyl acrylates and methacrylates) and copolymers of poly(alkyl acrylates and methacrylates with acrylic and methacrylic acid); poly(vinyl butyral); linear polyesters; and poly(urethane) elastomers. These and other useful binders are disclosed in U.S. Pat. Nos. 2,502,529; 2,887,379; 3,617,285; 3,300,310; 3,300, 311; and 3,743,833; and in *Research Disclosure*, Vol. 154, February 1977, Item 15444, and Vol. 182, June 1979. *Research Disclosure* is published by Kenneth Mason Publications, Ltd., Emsworth, Hampshire P010 7DD, England. Particularly preferred binders are poly(urethanes), such as those commercially available under the tradename Estane, from Goodrich Chemical Co., the tradename Permuthane from the Permuthane Division of ICI, and the tradename Cargill from Cargill, Inc.

Any conventional ratio of phosphor to binder can be employed. Generally thinner phosphor layers and sharper images are realized when a high weight ratio of phosphor to binder is employed. Preferred phosphor to binder ratios are in the range of from about 7:1 to 25:1 for panel constructions intended to withstand commercial exposure repetitions without loss of structural integrity. For limited or single exposure applications it is, of course, appreciated that any minimal amount of binder consistent with structural integrity is satisfactory.

The luminescent layer that includes the phosphor and binder can also include a variety of other materials. In addition to the environmentally degradable phosphor, the luminescent layer may also include one or more other phosphors that may or may not be subject to environmental degradation. Panel constructions containing more than one phosphor-containing layer are also possible, with iodine containing or otherwise environmentally-degradable phosphors being present in one or more of the phosphor-containing layers.

In particular embodiments of the invention, it may be desirable to add pigment to the luminescent layer. Suitable pigments and pigment concentrations, are well known to those skilled in the art. Typical pigments are materials such as titania and barium sulfate.

The luminescent layer overlies a support. For the highest attainable speeds a white support, such as a titania or barium sulfate loaded or coated support can be employed. Particular reflective supports which offer a balance of speed and sharpness are those containing reflective microlenslets, such as are disclosed in U.S. Pat. No. 4,912,333 to Roberts, et al.

In those instances in which it is desired to reduce the effective thickness of a phosphor layer below its actual thickness the phosphor layer is modified to impart a small, but significant degree of light absorption. If the binder is chosen to exhibit the desired degree of light absorption, then no other ingredient of the phosphor layer is required to perform the light attenuation function. It is specfically noted that the less structurally complex chromophores for ultraviolet absorption particularly lend themselves to incorporation in polymers. A separate absorber can be incorporated in the phosphor layer to reduce its effective thickness. The absorber can be a dye or pigment capable of absorbing light within a desired spectrum. Black dyes and pigments such as carbon black are, of course, generally useful with phosphors, because of their broad absorption spectra. With storage panels, it is preferable to include a dye or pigment which absorbs some of the stimulating radiation, generally provided by a laser; but mostly reflects emitted light. U.S. Pat. No. 4,491,736 to Teraoka teaches the use of such materials in storage panels.

Apart from the phosphor layers and the assembly features described above, the panel can be of any conventional construction. Panels typically have one or more flexible or rigid support layers. Flexible layers are most commonly polymeric. The most common polymeric supports are films of high dimensional integrity, such as poly(ethylene terephthalate) film supports. In a preferred embodiment of the invention, support is provided by one or more polymeric layers and by a rigid plate of aluminum or the like.

Metal layers, such as aluminum, may enhance reflection. Paper supports, though less common than film supports, are known and can be used for specific applications. Dyes and pigments are commonly loaded into supports to enhance absorption or reflection of light. Air can be trapped in supports to reflect ultraviolet and visible light. Supports and the subbing layers used to improve coating adhesion can be chosen from among those employed for silver halide photographic and radiographic elements, as illustrated by *Research Disclosure*, Vol. 176, December 1978, Item 17643, Section XVII, and *Research Disclosure*, Vol. 184, August 1979, Item 18431, Section I.

An overcoat layer, although not required, is commonly located over the luminescent layer for humidity and wear protection. The overcoat layer comprises a binder chosen using the criteria described above for the binder in the luminescent layer. It is understood that the binder used in the overcoat layer, and the binder forming the matrix in which the phosphor particles are held, are preferably formed of transparent resins that do not interfere with the passage of X-rays or stimulating radiation or the emitted light from the phosphors. The overcoat binder can be the same binder as in the luminescent layer or different and can also be chosen from polymers useful for supports. Since it is generally required that the overcoat layer exhibit toughness and scratch resistance, polymers conventionally employed for film supports are favored. For example, cellulose acetate is an overcoat commonly used with the poly(urethane) binders. Overcoat polymers are often used also to seal the edges of the phosphor layer. In a preferred embodiment of the invention, the overcoat is produced in accordance with U.S. Pat. No. 5,401,971 to Roberts.

While anticurl layers are not required for the panels, they are generally preferred for inclusion. The function of the anticurl layer is to balance the forces exerted by the layers coated on the opposite major surface of a support which, if left unchecked, cause the support to assume a non-planar configuration, that is, to curl or roll up on itself. Materials forming the anticurl layers can be chosen from among those identified above for use as binders and overcoats. Generally an anticurl layer is formed of the same polymer as the overcoat on the opposite side of the support. For example, cellulose acetate is preferred for both overcoat and anticurl layers.

Any one or combination of conventional panel features compatible with the features described herein can, of course, be employed. Conventional storage panel constructions are disclosed in U.S. Pat. No. 4,380,702 to Takahashi et al, the disclosure of which is hereby incorporated by reference. Conventional intensifying panel constructions are disclosed in *Research Disclosure*, Vol. 184, August 1979, Item 18431, hereby incorporated herein by reference.

The following Examples and Comparative Examples are presented to further illustrate some preferred modes of practice of the method of the invention. Unless otherwise indicated, all starting materials were commercially obtained. Preparation of phosphor cores:

Cores of $BaFBr_{0.85}I_{0.15}:Eu^{2+}$ were prepared as follows. In a 2000 ml beaker containing a Teflon coated magnetic stir bar, 269.54 grams of $BaBr_2 \cdot 2H_2O$ and 62.22 grams of $BaI_2.2H_2O$ were dissolved in a 2- to 3-fold excess of distilled water. The solution was then filtered. To the filtered solution was added 2.88 grams of fumed silica and 0.500 g of $BaS_2O_3.H_2O$ followed by 0.076 g of KBr, 175.33 grams of $BaF_2$ containing 0.002 moles of $EuF_2$, and 0.01 mol $CaF_2$ were then added to the solution slowly with vigorous stirring. Stirring was maintained for about 1 hour and the resulting slurry was then spray-dried through an air driven rotary atomizer at an inlet temperature of 350° C. and an outlet temperature of 110° C. The resulting white powder was then placed into alumina crucibles and fired at a temperature of 840°–860° C. for 3.5 hours under flowing nitrogen. The phosphor powder after being allowed to cool under nitrogen, was then ground and sieved through a 38 micron screen.

The relative photostimulated luminescence (PSL) intensities of the phosphor powders described below were measured by packing the powders in aluminum planchettes (2 mm high×24 mm in diameter), or in the case of coatings, by taking punches 25.4 mm in diameter, and simultaneously exposing the sample and a standard to unfiltered X-radiation. The X-ray source was a tungsten target tube operating at 15 kVp and 3.0 mA. After exposure to X-rays, the samples and standard were stimulated with a 4-millisecond pulse from a 12 mW helium-neon laser. The stimulated emission was detected using a photomultiplier tube after passing through a Schott BG-25 filter. The responses were corrected for X-ray exposure variations by normalizing the measured response in each case to an internal standard. The PSL responses for a particular sample are reported relative to a standard; the response of the standard was arbitrarily set=100.

EXAMPLE 1

5.00 g of phosphor and 0.10 g of benzoyl peroxide were placed into a 500 ml round-bottomed flask. Divinylbenzene, 2000 microliters, was then added to the powders via a piper followed by the addition of 100 microliters of glycidyl acrylate. The powders were then thoroughly mixed until all the particles were wetted by the divinylbenzene monomer. Dry hexane (18.0 ml) was then added to the reaction vessel and the contents stirred and purged of air by bubbling nitrogen into the suspension for 2 minutes at about 80 bubbles/minute. The reaction mixture was then continually stirred and refluxed for 4 hours under a continuous nitrogen purge of about 80 bubbles/minute. The contents were then cooled to 25° C. and the coated powder isolated by vacuum filtration, washed with 30 ml of dry hexane and air dried for 12 hours at 25° C.

Comparative Example 1

The comparative example 1 was performed in an identical manner and contemporaneously with Example 1, with the exception that no glycidyl acrylate was added to the mixture.

Comparative Example 2

Contemporaneously with Example 1, photostimulated luminescence (PSL) was measured for the uncoated phosphor cores prepared as above-described.

TABLE 1

| EXAMPLE OR COMPARATIVE EXAMPLE | PSL |
| --- | --- |
| Comparative Example 1 | 0.57 |
| Example 1 | 0.90 |
| Comparative Example 2 | 1.00 |

EXAMPLE 2

In this Example, the polymeric coating on the phosphor particles was epoxidized by converting any unreacted vinyl groups to epoxide functional groups. 0.50 g of m-chlorobenzoic acid was dissolved in about 60 ml of methylene chloride and 5.0 g of the coated phosphor particles of comparative example 3 was added and the suspension continuously stirred and refluxed for 6 hrs. The treated powder was then collected by filtration and air dried. The PSL of this sample is reported in Table 2.

Comparative Example 3

5.00 g of phosphor and 0.10 g of azobisisobutylnitrile (AIBN) were placed into a 500 ml round-bottomed flask followed by the addition of divinylbenzene, 2000 microliters. The powders were then thoroughly mixed until all the particles were wetted by the divinylbenzene monomer. Dry hexane (18.0 ml) was then added to the reaction vessel and the contents stirred and purged of air by bubbling nitrogen into the suspension for 2 minutes at about 80 bubbles/minute. The reaction mixture was then continually stirred and refluxed for 4 hours under a continuous nitrogen purge of about 80 bubbles/minute. The contents were then cooled to 25 C. and the coated powder isolated by vacuum filtration, washed with 30 ml of dry hexane and air dried for 12 hours at 25 C. The PSL is reported in Table 2.

Comparative Example 4

Comparative example 4 was performed in an identical manner as Comparative Example 3 except that AIBN was not added to the reaction mixture. The PSL is reported in Table 2.

EXAMPLE 3

0.50 g of m-chlorobenzoic acid was dissolved in about 60 ml of methylene chloride and 5.0 g of the coated phosphor particles of Comparative Example 4 were added and the suspension continuously stirred and refluxed for 6 hrs. The treated powder was then collected by filtration and air dried. The PSL is reported in Table 2.

TABLE 2

| EXAMPLE OR COMPARATIVE EXAMPLE | PSL |
| --- | --- |
| Comparative Example 3 | 1.00 |
| Example 2 | 1.33 |
| Comparative Example 4 | 1.00 |
| Example 3 | 1.28 |

Comparative Example 5

Into a round-bottomed flask was placed 16.0 ml of hexane and the solvent purged of oxygen by bubbling in nitrogen gas for 15 minutes with continuous stirring. 0.50 g of phosphor prepared as described in the experimental section was then added to the flask followed by 500 microliters of vinylnorbornene and 20 mg of benzoyl peroxide. The contents were then refluxed for 18 h under nitrogen gas with continuous stirring. The mixture was then cooled to 25 C. and the solid collected by filtration, washed with 35 ml of hexane and air dried. PSL results are given in Table 3.

EXAMPLE 4

The coated phosphor of Example 4 was was prepared in an identical manner as Comparative Example 5 above except that in addition 20 microliters of 1-allyloxy-2,3-epoxy propane was added to the rection contents before reluxing. PSL results are given in Table 3.

TABLE 3

| EXAMPLE OR COMPARATIVE EXAMPLE | PSL |
|---|---|
| Comparative Example 5 | 1.00 |
| Example 4 | 1.13 |

EXAMPLE 5

The coated phosphor particles of Example 1 were dispersed into a 13% (weight/weight) solution of PERMUTHANE™ U-6366 polyurethane marketed by ICI Polyurethanes Group of West Depfford, N.J. in 93:7 (weight/weight) dichloromethane/methanol solvent, such that the phosphor to binder ratio was 13:1. The suspension was then coated onto clear estar support using a doctor balde technique. A disk was then cut from the coating and placed into a chamber which was continually maintained at 90° F. and 90% R.H. and the speed of the punch monitored at various times as shown in Table 4.

Comparative Example 6

The phosphor core particles (untreated) were coated as described above with the exception 100 ul bisphenol A epoxide resin was added to the dispersion prior to coating. A disk was then cut from the coating and placed into a chamber which was continually maintained at 90 F. and 90% R.H. and the speed of the punch monitored at various times as shown in Table 4.

Comparative Example 7

The coated phosphor particles of Comparative Example 1 were coated in an identical manner as that of Example 5. A disk was then cut from the coating and placed into a chamber which was continually maintained at 90° F. and 90% R.H. and the speed of the punch monitored at various times as shown in Table 4.

TABLE 4

| TIME (days) | Example 5 | Comparative Example 6 | Comparative Example 7 |
|---|---|---|---|
| 0 | 100 | 100 | 100 |
| 3 | 92 | 91 | 89 |
| 8 | 65 | 43 | 47 |

While specific embodiments of the invention have been shown and described herein for purposes of illustration, the protection afforded by any patent which may issue upon this application is not strictly limited to a disclosed embodiment; but rather extends to all modifications and arrangements which fall fairly within the scope of the claims which are appended hereto:

What is claimed is:

1. A radiographic phosphor panel comprising: a support and a luminescent layer, said luminescent layer overlying said support, said luminescent layer comprising binder and coated particles, said binder being a film-forming polymer, said coated particles being embedded in said binder, said coated particles each having a core and a shell, said core consisting essentially of radiographic phosphor, said shell being exterior to and substantially enclosing said core, said shell comprising vinyl-epoxy resin, said resin having uncured epoxy groups having a concentration of from about $1 \times 10^{-5}$ to about 60 percent by weight relative to the weight of said shell, said resin having a different composition than said binder.

2. The radiographic phosphor panel of claim 1 wherein said concentration of uncured epoxy groups is from about 0.1 to about 20 percent by weight relative to the weight of the resin.

3. The radiographic phosphor panel of claim 1 wherein said concentration of uncured epoxy groups is from about 0.1 to about 4 percent by weight relative to the weight of the resin.

4. The radiographic phosphor panel of claim 1 wherein said resin is hydrophobic.

5. The radiographic phosphor panel of claim 4 wherein said resin is crosslinked.

6. The radiographic phosphor panel of claim 1 wherein said resin is crosslinked.

7. The radiographic phosphor panel of claim 1 wherein said resin is substantially insoluble in at least one solvent in which said binder has substantially complete solublity.

8. The radiographic phosphor panel of claim 1 wherein said polymer has a weight average molecular weight of from about 10,000 to about 1,000,000.

9. The radiographic phosphor panel of claim 1 wherein said resin has the general formula:

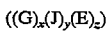

wherein

G is an olefinic subunit having from 2 to about 20 carbons and a valence greater than 2;

J is a divalent olefinic subunit having from 2 to about 20 carbons;

E is an epoxide-substituted olefinic subunit having from 4 to about 22 carbons, a valence of 2 or greater;

x is from about 0.01 to about 99.99 mole percent;

y is from 0 to about 99.98 mole percent;

z is from about 0.01 to about 10 mole percent; and x+y+z is substantially equal to 100 mole percent.

10. The radiographic phosphor panel of claim 9 wherein G has the general formula:

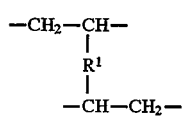

and J has the general formula:

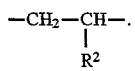

11. The radiographic phosphor panel of claim 9 wherein said resin is the addition polymerization product of divinylbenzene, styrene and glycidyl acrylate.

12. The radiographic phosphor panel of claim 1 wherein said shell has a thickness of from about 0.01 to about 10 micrometers.

13. The radiographic phosphor panel of claim 1 wherein said shell has a thickness of from about 0.1 to about 2 micrometers.

14. The radiographic phosphor panel of claim 1 wherein the concentration of said resin in said coated particles is from about 0.1 to about 10 weight percent relative to the weight of said coated particles.

15. The radiographic phosphor panel of claim 1 wherein the concentration of said resin in said coated particles is from about 0.5 to about 2 weight percent relative to the weight of said coated particles.

16. A radiographic phosphor panel comprising: a support and a luminescent layer, said luminescent layer overlying said support, said luminescent layer comprising binder and coated particles, said binder being a film-forming polymer, said coated particles being embedded in said binder, said coated particles each having a core and a shell, said core consisting essentially of environmentally degradable radiographic phosphor, said shell being exterior to and substantially enclosing said core, said shell comprising vinyl-epoxy resin, said resin having uncured epoxy groups having a concentration of from about $1 \times 10^{-5}$ to about 60 percent by weight relative to the weight of said shell, said resin having a different composition than said binder.

17. A stabilized radiographic phosphor composition of matter comprising a mass of particles, said particles each having a core and a shell, said core consisting essentially of environmentally degradable radiographic phosphor;

said shell being exterior to and substantially enclosing said core, said shell comprising a vinyl resin having uncured epoxy groups having a concentration of from about $1 \times 10^{-5}$ to about 60 percent by weight relative to the weight of said shell.

18. The phosphor composition of claim 17 wherein said resin is hydrophobic.

19. The phosphor composition of claim 18 wherein said resin is crosslinked.

20. The phosphor composition of claim 17 wherein said resin is crosslinked.

21. The phosphor composition of claim 17 wherein said resin is substantially insoluble in at least one solvent in which said binder has substantially complete solublity.

22. The phosphor composition of claim 17 wherein said polymer has a weight average molecular weight of from about 10,000 to about 1,000,000.

23. The phosphor composition of claim 17 wherein shell has a thickness of from about 0.01 to about 10 micrometers and the concentration of said resin in said coated particles is from about 0.1 to about 10 weight percent relative to the weight of said coated particles.

* * * * *

UNITED STATES PATENT AND TRADEMARK OFFICE
CERTIFICATE OF CORRECTION

PATENT NO. : 5,646,412

DATED : July 8, 1997

INVENTOR(S) : Bryan et al.

It is certified that error appears in the above-identified patent and that said Letters Patent is hereby corrected as shown below:

Title page, column 1, after [22], insert

-- Related U.S. Application Data
[60] Provisional Application Serial No. 60/001,506, filed 19 July 1995. --

Column 1, line 4, insert

-- CROSS REFERENCE TO RELATED APPLICATION
   Reference is made to and priority claimed from U.S. Provisional Application Serial No. US 60/001,506, filed 19 July 1995, entitled COATED RADIOGRAPHIC PHOSPHORS AND RADIOGRAPHIC PHOSPHOR PANELS --.

Signed and Sealed this

Sixteenth Day of December, 1997

Attest:

BRUCE LEHMAN

Attesting Officer

Commissioner of Patents and Trademarks